(12) United States Patent
Cao

(10) Patent No.: US 9,408,267 B2
(45) Date of Patent: Aug. 2, 2016

(54) LED BACKLIGHT FOR LIQUID CRYSTAL DISPLAY (LCD) APPARATUS

(71) Applicant: SHENZHEN CHINA STAR OPTOELECTRONICS TECHNOLOGY CO., LTD., Shenzhen, Guangdong (CN)

(72) Inventor: Dan Cao, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 82 days.

(21) Appl. No.: 14/367,797

(22) PCT Filed: May 21, 2014

(86) PCT No.: PCT/CN2014/078006
§ 371 (c)(1),
(2) Date: Jun. 20, 2014

(87) PCT Pub. No.: WO2015/172402
PCT Pub. Date: Nov. 19, 2015

(65) Prior Publication Data
US 2015/0334791 A1 Nov. 19, 2015

(30) Foreign Application Priority Data

May 14, 2014 (CN) .......................... 2014 1 0204299

(51) Int. Cl.
*H05B 37/02* (2006.01)
*H05B 33/08* (2006.01)
(Continued)

(52) U.S. Cl.
CPC .............. *H05B 33/083* (2013.01); *G02B 27/22* (2013.01); *G09G 3/34* (2013.01); *G09G 3/36* (2013.01); *G09G 5/10* (2013.01); *H04N 13/0438* (2013.01); *H04N 13/0454* (2013.01); *H05B 33/0815* (2013.01); *H05B 37/02* (2013.01)

(58) Field of Classification Search
CPC ....... H05B 39/06; H05B 37/036; G02B 27/22
USPC ...... 315/185 R, 192, 291, 294, 297, 302, 307
See application file for complete search history.

(56) References Cited

U.S. PATENT DOCUMENTS 8,237,379 B2 * 8/2012 Liu ....................... G09G 3/3406
315/185 R
8,395,325 B2 * 3/2013 Ye ....................... H05B 33/0827
315/122

(Continued)

FOREIGN PATENT DOCUMENTS

CN 103298210 9/2013
CN 203313488 11/2013

*Primary Examiner* — Jason M Crawford
(74) *Attorney, Agent, or Firm* — Brooks Kushman P.C.

(57) ABSTRACT

A LED backlight for a liquid crystal display (LCD), having a boost circuit for boosting in different display modes, an input voltage for operating each LED in a current display mode. The display modes include 2D and 3D display modes. A plurality of LED strings which are connected in parallel, wherein each LED string having a predetermined number of LEDs connected in series and receives the working voltage required for operating from the boost circuit. A current regulation circuit for regulating in the different display modes, with current flowing through each LED string, such that a ratio of the current flowing through each LED string in the 3D display mode and in the 2D display mode is changed. A controller provides a driving signal to drive the boost circuit, and provides different voltages to the current regulation circuit in the different display modes.

16 Claims, 4 Drawing Sheets

(51) Int. Cl.
  *G02B 27/22* (2006.01)
  *G09G 5/10* (2006.01)
  *G09G 3/36* (2006.01)
  *G09G 3/34* (2006.01)
  *H04N 13/04* (2006.01)

(56) References Cited

U.S. PATENT DOCUMENTS

| | | | |
|---|---|---|---|
| 8,598,805 B2 * | 12/2013 | Tremblay | F21K 9/135 315/291 |
| 8,729,829 B2 * | 5/2014 | Serdarevic | H05B 33/0812 315/185 R |
| 8,975,833 B2 * | 3/2015 | Han | H05B 33/0815 315/294 |
| 2011/0012521 A1 * | 1/2011 | Byun | G09G 3/3406 315/186 |
| 2011/0062889 A1 * | 3/2011 | Hoogzaad | G09G 3/342 315/294 |
| 2011/0115889 A1 * | 5/2011 | Kim | G09G 3/003 348/56 |
| 2014/0128941 A1 * | 5/2014 | Williams | A61N 5/06 607/88 |
| 2015/0161949 A1 * | 6/2015 | Wang | G09G 3/3406 315/307 |

* cited by examiner

LED BACKLIGHT FOR LIQUID CRYSTAL DISPLAY (LCD) APPARATUS

CROSS-REFERENCE TO RELATED APPLICATION

This application is the U.S. national phase of PCT Application No. PCT/CN2014/078006 filed on May 21, 2014, which claims priority to CN Patent Application No. 201410204299.2 filed on May 14, 2014, the disclosures of which are incorporated in their entirety by reference herein.

TECHNICAL FIELD

The present application relates to liquid crystal display technology, in particular, relates to a LED (Light Emitting Diode) backlight for a LCD apparatus.

DESCRIPTION OF RELATED ART

With the development of displaying technology, the backlight technology of the liquid crystal display apparatus is under continuous progress. Backlight of a traditional LCD apparatus uses a Cold Cathode Fluorescent Lamp (CCFL). However, since the CCFL backlight has disadvantages such as a worse color restoration ability, low light emitting efficiency, high discharge voltage, poor discharge characteristic at low temperature and a long time for heating to a stable gray and so on, the backlight technology using LED backlight has been developed currently.

Since LED is a low voltage nonlinear semiconductor device, and a positive voltage of the LED varies with change of the current and temperature, it is necessary to provide a driving voltage to LED through a special driving circuit so as to drive LED.

So far, in the driving circuit of the LED backlight, the current flowing through LED in 2D and 3D display modes is fixed, that is to say, a ratio of the current flowing through LED in 3D display mode and the current flowing through LED in 2D display mode is fixed. Since among different types (such as different sizes) of LCD apparatus, the ratio of the current flowing through LED in 3D display mode and the current flowing through LED in 2D display mode is different, in case the ratio of the current flowing through LED in 3D display mode and the current flowing through LED in 2D display mode is fixed, the application of the driving circuit of the LED backlight to different types of the LCD display apparatus is limited.

SUMMARY

In order to solve above problems existing in the conventional art, a purpose of the present invention is to provide a LED backlight for a LCD apparatus which can change a ratio of a current flowing through the LED in a 3D display mode and the current flowing through the LED in a 2D display mode.

According to an aspect of the present invention, a LED backlight for a LCD apparatus is provided, the apparatus including: a boost circuit for boosting, in different display modes, an input voltage to a working voltage required for operating each LED string in a current display mode, wherein the display modes include a 2D display mode and a 3D display mode; a plurality of LED strings which are connected in parallel, wherein each LED string comprises a predetermined number of LEDs which are connected in series and receives the working voltage required for operating from the boost circuit; a current regulation circuit for regulating, in the different display modes, a current flowing through each LED string, such that a ratio of the current flowing through each LED string in the 3D display mode and the current flowing through each LED string in the 2D display mode is varied; a controller for providing a driving signal to drive the boost circuit, and providing different display mode voltages to the current regulation circuit in the different display modes.

Furthermore, in each LED string, the predetermined number of LEDs are connected to a first resistor in series.

Furthermore, the current regulation circuit comprises: a plurality of voltage regulation circuits, wherein each voltage regulation circuit changes a voltage between the predetermined number of LEDs in a corresponding LED string and the first resistor in the different display modes, thereby regulating the current flowing through the LED string; a resistance regulation circuit for changing, in the different display modes, an output resistance of each voltage regulation circuit, such that each voltage regulation circuit changes the voltage between the predetermined number of LEDs in the corresponding LED string and the first resistor.

Furthermore, the voltage regulation circuit comprises a second resistor, a third resistor and a fourth resistor, wherein a first end of the second resistor is coupled to a node between the predetermined number of LEDs and the first resistor, a second end of the second resistor is coupled to a first end of the third resistor and receives the different display mode voltage, a second end of the third resistor is coupled to a first end of the fourth resistor and is coupled to the resistance regulation circuit, and a second end of the fourth resistor is coupled to the resistance regulation circuit.

Furthermore, the resistance regulation circuit comprises a first MOS transistor, a second MOS transistor, a third MOS transistor, a fifth resistor and a sixth resistor, wherein a gate of the first MOS transistor receives 2D/3D display signals, a drain of the first MOS transistor is coupled to the second end of the third resistor of each voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to the second end of the fourth resistor of each voltage regulation circuit, and a source of the third MOS transistor is electrically grounded.

According to another aspect of the present invention, a LED backlight for a LCD apparatus is provided, the apparatus including: a boost circuit for boosting, in different display modes, an input voltage to a working voltage required for operating each LED string in a current display mode, wherein the display modes include a 2D display mode and a 3D display mode; a LED string comprising a predetermined number of LEDs which are connected in series and receiving the working voltage required for operating from the boost circuit; a current regulation circuit for regulating, in the different display modes, a current flowing through the LED string, such that a ratio of the current flowing through the LED string in the 3D display mode and the current flowing through the LED string in the 2D display mode is varied; a controller for providing a driving signal to drive the boost circuit, and providing different display mode voltages to the current regulation circuit in the different display modes.

Furthermore, in the LED string, the predetermined number of LEDs are connected to a first resistor in series.

Furthermore, the current regulation circuit comprises: a voltage regulation circuit for changing a voltage between the predetermined number of LEDs in the LED string and the first resistor in the different display modes, thereby regulating a current flowing through the LED string; a resistance regulation circuit for changing, in the different display modes, an output resistance of the voltage regulation circuit, such that the voltage regulation circuit changes the voltage between the predetermined number of LEDs in the LED string and the first resistor.

Furthermore, the voltage regulation circuit comprises a second resistor, a third resistor and a fourth resistor, wherein a first end of the second resistor is coupled to a node between the predetermined number of LEDs and the first resistor, a second end of the second resistor is coupled to a first end of the third resistor and receives the different display mode voltage, a second end of the third resistor is coupled to a first end of the fourth resistor and is coupled to the resistance regulation circuit, and a second end of the fourth resistor is coupled to the resistance regulation circuit.

Furthermore, the resistance regulation circuit comprises a first MOS transistor, a second MOS transistor, a third MOS transistor, a fifth resistor and a sixth resistor, wherein a gate of the first MOS transistor receives 2D/3D display signals, a drain of the first MOS transistor is coupled to the second end of the third resistor of the voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to the second end of the fourth resistor of the voltage regulation circuit, and a source of the third MOS transistor is electrically grounded.

The LED backlight for the LCD apparatus according to the present invention can arbitrarily change the ratio of the current flowing through each LED string in the 3D display mode and the current flowing through the LED string in the 2D display mode, thereby enlarging applications of a driving circuit of the LED backlight in different types of LCD apparatus.

BRIEF DESCRIPTION OF THE DRAWINGS

The above and other aspects, features and advantages of the embodiments in the present invention will become apparent and more readily appreciated from the following description, taken in conjunction with the accompanying drawings in which.

DETAILED DESCRIPTION OF EXEMPLARY EMBODIMENTS

Embodiments of the present invention will be described in detail below by referring to the accompany drawings. However, the present invention can be implemented in many different forms, and the present invention may not be explained to be limited thereto. Instead, these embodiments are provided for explaining a principle and actual applications of the present invention, and thus other skilled in the art can understand various embodiments and amendments which are suitable for specific intended applications of the present invention.

Figure 1:
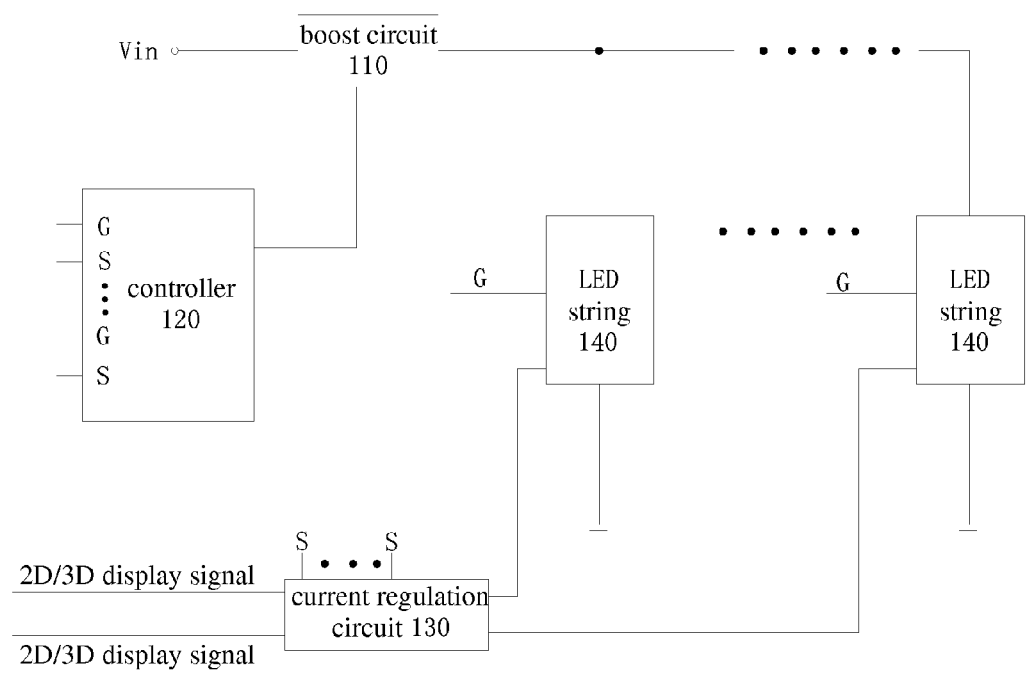
FIG. 1 is a block diagram of a LED backlight for a LCD apparatus according to a first embodiment of the present invention.
Figure 2:
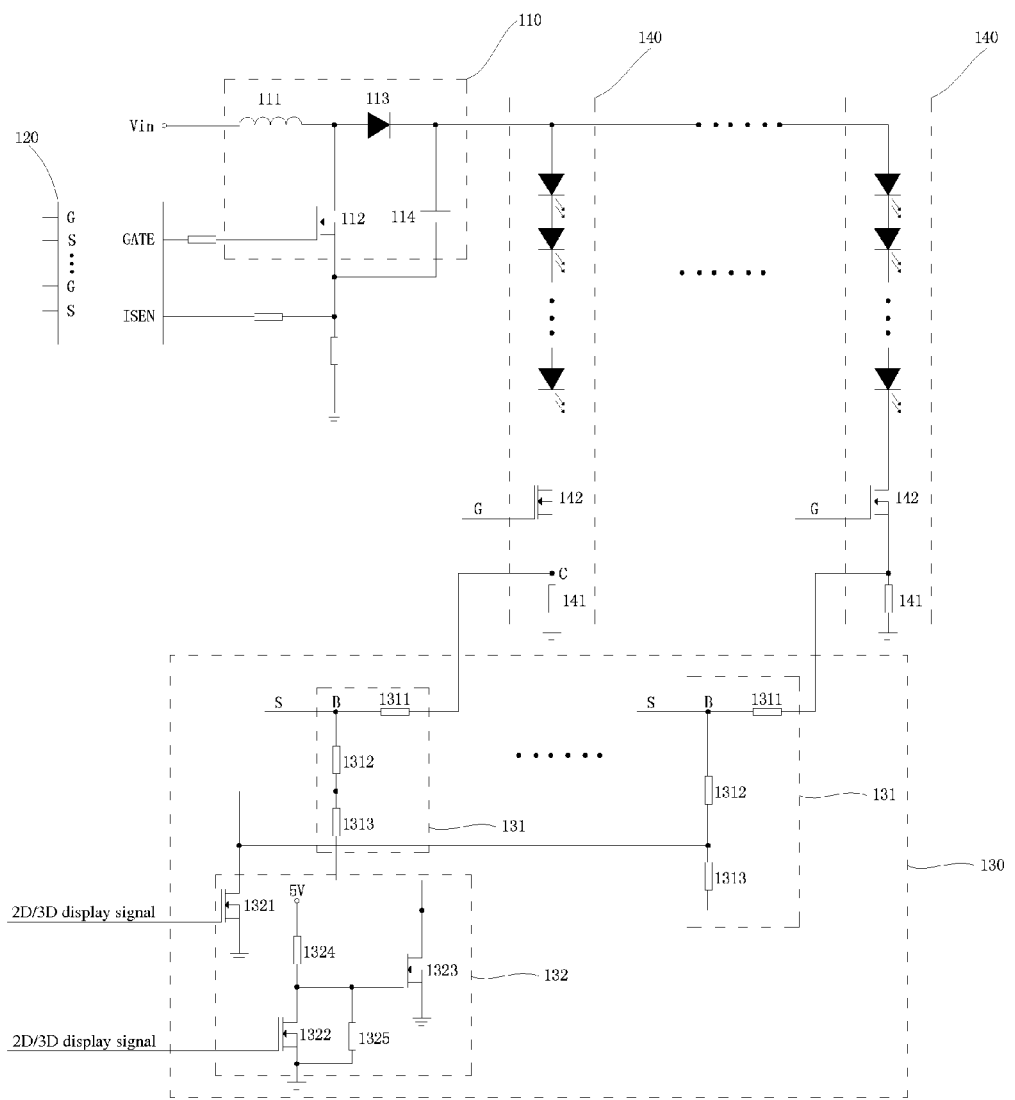
FIG. 2 is a circuit diagram of the LED backlight for the LCD apparatus according to the first embodiment of the present invention.

FIG. 1 is a block diagram of a LED backlight for a LCD apparatus according to a first embodiment of the present invention. FIG. 2 is a circuit diagram of the LED backlight for the LCD apparatus according to the first embodiment of the present invention.

Referring to FIGS. 1-2, the LED backlight 100 according to the first embodiment of the present invention includes a boost circuit 110, a controller 120, a current regulation circuit 130 and a plurality of LED strings 140 which are connected in parallel.

The boost circuit 110 may be for example an inductive-boost circuit for boosting, in different display modes (such as a 2D display mode and a 3D display mode), an input voltage to a working voltage required for operating each LED string 140 in a current display mode. The boost circuit 110 includes an inductor 111, a Metal Oxide Semiconductor (MOS) transistor 112, a rectifying diode 113 and a capacitor 114.

In the boost circuit 110, the inductor 111 is an energy conversion device for electric energy and magnetic field energy conversion, and when a gate of the MOS transistor 112 receives a high level signal provided by the controller 120, the inductor 111 converts the electric energy into the magnetic field energy and stores the magnetic field energy. When the gate of the MOS transistor 112 receives a low level signal provided by the controller 120, the inductor 111 converts the stored magnetic field energy into the electric energy, and the electric energy is superimposed to the input voltage to obtain a DC voltage through filtering of the rectifying diode 113 and the capacitor 114, the DC voltage, as the working voltage required for the normal work of each LED string 140, being provided to each LED string 140. Since the DC voltage is formed by superimposing the input voltage Vin and the electric energy into which the magnetic field energy of the inductor 111 is converted, the DC voltage is higher than the input voltage Vin.

The plurality of LED strings 140 which are connected in parallel are used as the backlight of the LCD apparatus, herein each LED string comprises a plurality of LEDs which are connected in series, a MOS transistor 142 and a first resistor 141, and each LED string 140 receives its working voltage required for operating from the boost circuit 110. Further, the controller 120 provides the high level signal or low level signal to control the MOS transistor 142 to be turned on or off, thereby controlling each LED string 140 to be turned on or off.

The number N (N is an integer greater than zero) of the LEDs in each LED string 140 is determined in following ways:

$$N \times Vd \leq Vs,$$

in which, Vd is a normal lighting voltage of each LED, Vs is the working voltage of each LED string received from boost circuit 110.

For example, when Vd is 6.5V and Vs is 24V, N is greater or equal to 3.

The controller (usually a backlight driver IC) 120 provides a first driving signal (such as the high level signal or low level signal) so as to drive the boost circuit 110, and the controller 120 provides different display mode voltages (such as a 2D display mode voltage $V_{b\text{-}2D}$ and a 3D display mode voltage $V_{b\text{-}3D}$) to the current regulation circuit 130 in the different display modes. In addition, the controller 120 also can provide a second driving signal (such as the high level signal or low level signal) so as to control the MOS transistor 142 to be turned on or off, thereby controlling each LED string 140 to be turned on or off. Thus the controller 120 includes a GATE end which is coupled to the gate of the MOS transistor 112 of the boost circuit 110, a plurality of display mode voltage output ends S which are coupled to the current regulation circuit 130 and a plurality of driving signal output ends G which are respectively coupled to gates of the MOS transistors 142 in the plurality of LED strings 140.

The current regulation circuit 130 receives the display mode voltages output by the display mode voltage output ends S of the controller 120 and regulates, in the different display modes, the current flowing through each LED string 140, such that a ratio of the current flowing through LED in the 3D display mode and the current flowing through LED in the 2D display mode can be varied arbitrarily.

The current regulation circuit 130 includes: voltage regulation circuits 131 and a resistance regulation circuit 132. Herein, the number of the voltage regulation circuits 131 is equal to that of the LED strings 140, in other words, a voltage regulation circuit 131 regulates a LED string 140 correspondingly.

Each voltage regulation circuit 131 changes a voltage between the plurality of LEDs in the corresponding LED string 140 and the first resistor 141 (that is, a voltage of a negative terminal of the plurality LEDs which are connected in series) in the different display modes, and thus regulates the current flowing through the LED string 140. The resistance regulation circuit 132 changes, in the different display modes, an output resistance of each voltage regulation circuit, such that each voltage regulation circuit 131 changes the voltage between the plurality of LEDs in the corresponding LED string 140 and the first resistor 141.

Hereinafter, specific circuit structures of the voltage regulation circuit 131 and the resistance regulation circuit 132 will be explained in details.

Each voltage regulation circuit 131 includes a second resistor 1311, a third resistor 1312 and a fourth resistor 1313.

A first end of the second resistor 1311 is coupled to a node between the plurality LEDs in the LED string 140 and the first resistor 141, a second end of the second resistor 1311 is coupled to a first end of the third resistor 1312 and receives the display mode voltage output from the display mode voltage output end S of the controller 120, a second end of the third resistor 1312 is coupled to a first end of the fourth resistor 1313 and is coupled to a drain of a first MOS transistor 1321 of the resistance regulation circuit 132, and a second end of the fourth resistor 1313 is coupled to a drain of a third MOS transistor 1323 of the resistance regulation circuit 132.

The resistance regulation circuit 132 includes the first MOS transistor 1321, a second MOS transistor 1322, the third MOS transistor 1323, a fifth resistor 1324 and a sixth resistor 1325.

A gate of the first MOS transistor 1321 receives 2D/3D display signals, the drain of the first MOS transistor 1321 is coupled to the second end of the third resistor 1312 of each voltage regulation circuit 131, and a source of the first MOS transistor 1321 is electrically grounded. A gate of the second MOS transistor 1322 receives the 2D/3D display signals, a drain of the second MOS transistor 1322 is coupled to a first end of the fifth resistor 1324, and a source of the second MOS transistor 1322 is electrically grounded. A second end of the fifth resistor 1324 receives a pull-up voltage (for example, a voltage of 5V). A first end of the sixth resistor 1325 is coupled to the drain of the second MOS transistor 1322 and a second end thereof is electrically grounded. A gate of the third MOS transistor 1323 is coupled to the drain of the second MOS transistor 1322, a drain of the third MOS transistor 1323 is coupled to the second end of the fourth resistor 1313 of each voltage regulation circuit 131, and a source of the third MOS transistor 1323 is electrically grounded. The fifth resistor 1324 mainly plays a current-limiting role when the second MOS transistor 1322 is turned on.

In addition, in this embodiment, the 2D display signal is a low level signal, and the 3D display signal is a high level signal, but the present invention is not limited thereto.

Hereinafter, it is specifically explained how to regulate the current flowing through each LED string 140 by using the current regulation circuit 130 in the different display modes.

When the LCD apparatus is in the 2D display mode, the gate of the first MOS transistor 1321 and the gate of the second MOS transistor 1322 receive the 2D display signal (namely, the low level signal), the first MOS transistor 1321 and the second MOS transistor 1322 are turned off, and the third MOS transistor 1323 is turned on because a pull-up voltage is received by the gate thereof, thus a voltage between the plurality LEDs in each LED string 140 and the first resistor 141, that is, a voltage $V_{c\text{-}2D}$ of a node C, can be represented by the following equation (1):

$$V_{c-2D} = V_{b-2D} \times \frac{R2 + R3 + R4}{R3 + R4} \qquad (1)$$

wherein $V_{b\text{-}2D}$ represents the 2D display mode voltage provided by the controller 120, that is, a voltage of a node B in the 2D display mode; R2 represents a resistance value of the second resistor 1311; R3 represents a resistance value of the third resistor 1312; R4 represents a resistance value of the fourth resistor 1313.

As such, a current $I_{2D}$ flowing through each LED string 140 can be represented by the following equation (2):

$$I_{2D} = V_{b-2D} \times \frac{R2 + R3 + R4}{(R3 + R4) \times R1} \qquad (2)$$

wherein R1 represents a resistance value of the first resistor 141.

When the LCD apparatus is in the 3D display mode, the gate of the first MOS transistor 1321 and the gate of the second MOS transistor 1322 receive the 3D display signal (namely, the high level signal), the first MOS transistor 1321 and the second MOS transistor 1322 are turned on, and the third MOS transistor 1323 is turned-off, thus the voltage between the plurality LEDs in each LED string 140 and the first resistor 141, that is, a voltage $V_{c\text{-}3D}$ of the node C, can be represented by the following equation (3):

$$V_{c-3D} = V_{b-3D} \times \frac{R2 + R3}{R3} \quad (3)$$

wherein $V_{b\text{-}3D}$ represents the 3D display mode voltage provided by the controller 120, that is, the voltage of note B in 3D display mode; R2 represents the resistance value of the second resistor 1311; R3 represents the resistance value of the third resistor 1312.

As such, a current $I_{3D}$ flowing through each LED string 140 can be represented by the following equation (4):

$$I_{3D} = V_{b-3D} \times \frac{R2 + R3}{R3 \times R1} \quad (4)$$

wherein R1 represents the resistance value of the first resistor 141.

Therefore, the ratio of the current $I_{3D}$ flowing through each LED string 140 in the 3D display mode and the current $I_{2D}$ flowing through each LED string 140 in the 2D display mode can be represent by the following equation (5):

$$\frac{I_{3D}}{I_{2D}} = \frac{V_{b-3D}}{V_{b-2D}} \times \frac{(R2+R3) \times (R3+R4)}{(R2+R3+R4) \times R3} \quad (5)$$

In the equation (5), although $$\frac{V_{b-3D}}{V_{b-2D}}$$

is controlled by the controller 120, the ratio of the current $I_{3D}$ flowing through each LED string 140 in the 3D display mode and the current $I_{2D}$ flowing through each LED string 140 in the 2D display mode can be arbitrarily adjusted by adjusting the resistance value R2 of the second resistor 1311, the resistance value R3 of the third resistor 1312 and the resistance value R4 of the fourth resistor 1313, thereby enlarging the application of the driving circuit of the LED backlight in different types of LCD apparatus.

Figure 3:
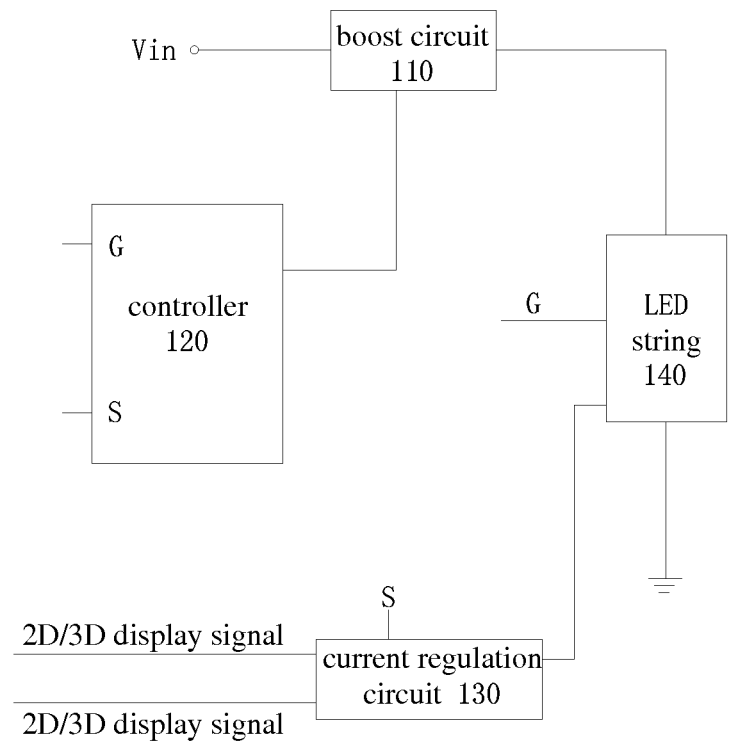
FIG. 3 is a block diagram of a LED backlight for a LCD apparatus according to a second embodiment of the present invention.
Figure 4:
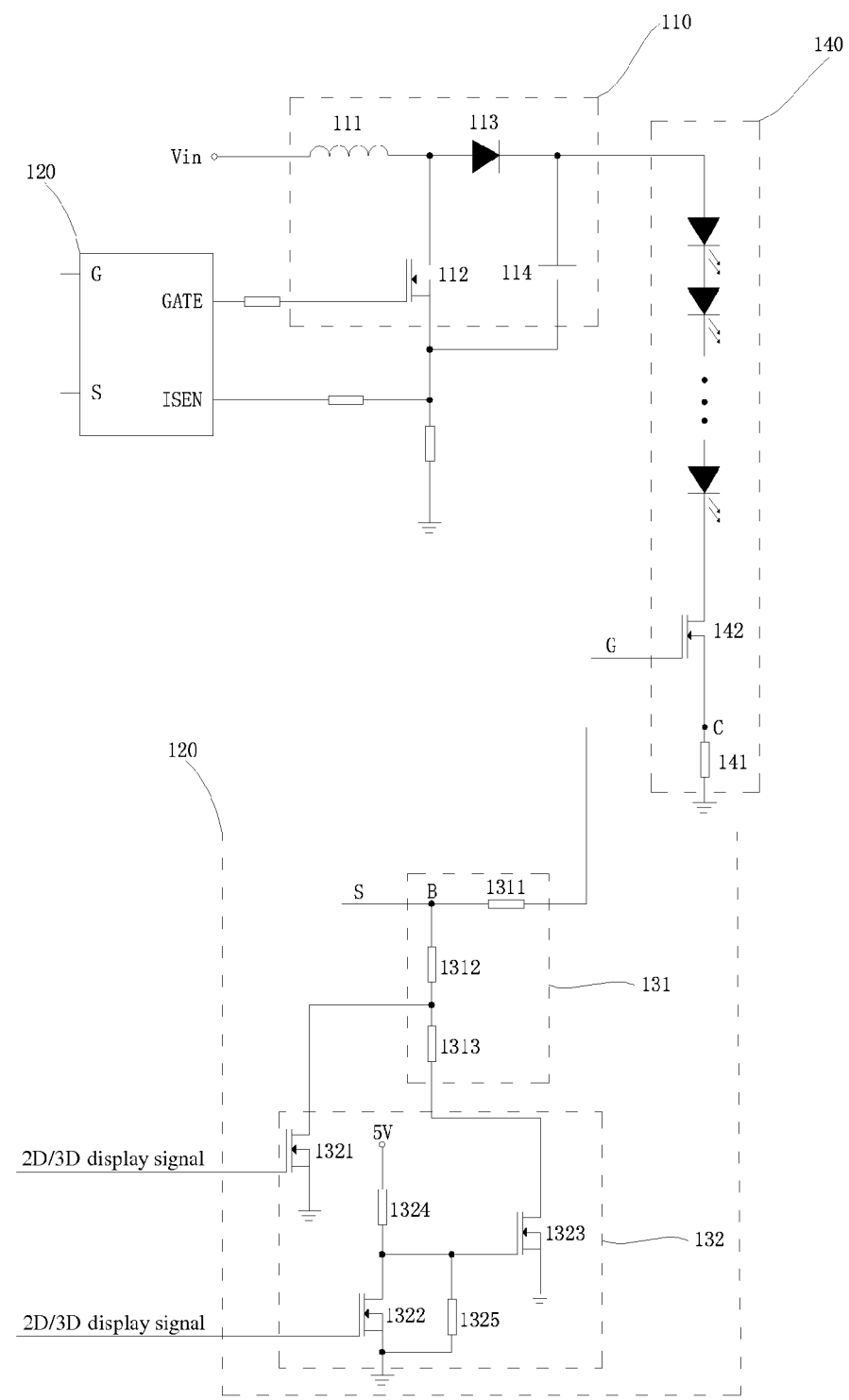
FIG. 4 is a circuit diagram of the LED backlight for the LCD apparatus according to the second embodiment of the present invention.

FIG. 3 is a block diagram of a LED backlight for a LCD apparatus according to a second embodiment of the present invention. FIG. 4 is a circuit diagram of the LED backlight for the LCD apparatus according to the second embodiment of the present invention.

Referring to FIGS. 3 and 4, the LED backlight for the LCD apparatus according to the second embodiment of the present invention includes a boost circuit 110, a controller 120, a current regulation circuit 130 and LED strings 140.

The boost circuit 110 may be for example an inductive-boost circuit for boosting, in different display modes (such as a 2D display mode and a 3D display mode), an input voltage to a working voltage required for operating LED strings in a current display mode. The boost circuit 110 includes: an inductor 111, a Metal Oxide Semiconductor (MOS) transistor 112, a rectifying diode 113 and a capacitor 114.

In the boost circuit 110, the inductor 111 is an energy conversion device for electric energy and magnetic field energy conversion, and when a gate of the MOS transistor 112 receives a high level signal provided by the controller 120, the inductor 111 converts the electric energy into the magnetic field energy and stores the magnetic field energy. When the gate of the MOS transistor 112 receives a low level signal provided by the controller 120, the inductor 111 converts the stored magnetic field energy into the electric energy, and the electric energy is superimposed to the input voltage to obtain a DC voltage through filtering of the rectifying diode 113 and the capacitor 114, the DC voltage, as the working voltage required for normal work of each LED string 140, being provided to each LED string 140. Since the DC voltage is formed by superimposing the input voltage Vin and the electric energy into which the magnetic field energy of the inductor 111 is converted, the DC voltage is higher than the input voltage Vin.

The LED string 140, as the backlight of the LCD apparatus, includes a plurality of LEDs which are connected in series, a MOS transistor 142 and a first resistor 141, and the LED string 140 receive their working voltages required for operating from the boost circuit 110. Further, the controller 120 provides the high level signal or low level signal to control the MOS transistor 142 to be turned on or off, thereby controlling each LED string 140 to be turned on or off.

The number N (N is an integer greater than zero) of the LEDs in the LED string 140 is determined in following ways:

$$N \times Vd \leq Vs,$$

in which, Vd is a normal lighting voltage of each LED, Vs is the working voltage of each LED string received from boost circuit 110.

For example, when Vd is 6.5V and Vs is 24V, N is greater or equal to 3.

The controller (usually a backlight driver IC) 120 provides a first driving signal (such as the high level signal or low level signal) so as to drive the boost circuit 110, and the controller 120 provides different display mode voltages (such as a 2D display mode voltage $V_{b\text{-}2D}$ and a 3D display mode voltage $V_{b\text{-}3D}$) to the current regulation circuit 130 in the different display modes. In addition, the controller 120 also can provide a second driving signal (such as the high level signal or low level signal) so as to control the MOS transistor 142 to be turned on or off, thereby controlling the LED string 140 to be turned on or off Thus the controller 120 includes a GATE end which is coupled to the gate of the MOS transistor 112 of the boost circuit 110, an output end S which is coupled to the current regulation circuit 130 and a plurality of driving signal output ends G which are respectively coupled to the gates of the MOS transistors 142 in the LED string 140.

The current regulation circuit 130 receives the display mode voltages output by the display mode voltage output end S of the controller 120 and regulates, in the different display modes, the current flowing through the LED string 140, such that a ratio of the current flowing through LED in the 3D display mode and the current flowing through the LED string 140 in the 2D display mode can be varied arbitrarily.

The current regulation circuit 130 includes a voltage regulation circuit 131 and a resistance regulation circuit 132.

The voltage regulation circuit 131 changes a voltage between the plurality of LEDs in the LED string 140 and the first resistor 141 in the different display modes, and thus regulates the current flowing through the LED string 140. The resistance regulation circuit 132 changes, in the different display modes, an output resistance of the voltage regulation circuit 131, such that the voltage regulation circuit 131 changes the voltage between the plurality of LEDs in the LED string 140 and the first resistor 141.

Hereinafter, specific circuit structures of the voltage regulation circuit 131 and the resistance regulation circuit 132 will be explained in details.

The voltage regulation circuit 131 includes a second resistor 1311, a third resistor 1312 and a fourth resistor 1313.

A first end of the second resistor 1311 is coupled to a node between the plurality LEDs in the LED string 140 and the first resistor 141, a second end of the second resistor 1311 is coupled to a first end of the third resistor 1312 and receives the display mode voltage output from the display mode voltage output end S of the controller 120, a second end of the third resistor 1312 is coupled to a first end of the fourth resistor 1313 and is coupled to a drain of a first MOS transistor 1321 of the resistance regulation circuit 132, and a second end of the fourth resistor 1313 is coupled to a drain of a third MOS transistor 1323 of the resistance regulation circuit 132.

The resistance regulation circuit 132 includes the first MOS transistor 1321, a second MOS transistor 1322, the third MOS transistor 1323, a fifth resistor 1324 and a sixth resistor 1325.

A gate of the first MOS transistor 1321 receives 2D/3D display signals, the drain of the first MOS transistor 1321 is coupled to the second end of the third resistor 1312 of the voltage regulation circuit 131, and a source of the first MOS transistor 1321 is electrically grounded. A gate of the second MOS transistor 1322 receives the 2D/3D display signals, a drain of the second MOS transistor 1322 is coupled to a first end of the fifth resistor 1324, and a source of the second MOS transistor 1322 is electrically grounded. A second end of the fifth resistor 1324 receives a pull-up voltage (for example, a voltage of 5V). A first end of the sixth resistor 1325 is coupled to the drain of the second MOS transistor 1322 and a second end thereof is electrically grounded. A gate of the third MOS transistor 1323 is coupled to the drain of the second MOS transistor 1322, a drain of the third MOS transistor 1323 is coupled to the second end of the fourth resistor 1313 of the voltage regulation circuit 131, and a source of the third MOS transistor 1323 is electrically grounded. The fifth resistor 1324 mainly plays a current-limiting role when the second MOS transistor 1322 is turned on.

In addition, in this embodiment, the 2D display signal is the low level signal, the 3D display signal is the high level signal, but the present invention is not limited thereto.

Hereinafter, it is specifically explained how to regulate the current flowing through each LED string 140 by using the current regulation circuit 130 in the different display modes.

When the LCD apparatus is in the 2D display mode, the gate of the first MOS transistor 1321 and the gate of the second MOS transistor 1322 receive the 2D display signal (namely, the low level signal), the first MOS transistor 1321 and the second MOS transistor 1322 are turned off, and the third MOS transistor 1323 is turned on because a pull-up voltage is received by the gate thereof, thus a voltage between the plurality LEDs in the LED string 140 and the first resistor 141, that is, a voltage $V_{c\text{-}2D}$ of a node C, can be represented by the following equation (1):

$$V_{c-2D} = V_{b-2D} \times \frac{R2 + R3 + R4}{R3 + R4} \quad (1)$$

wherein $V_{b\text{-}2D}$ represents the 2D display mode voltage provided by the controller 120, that is, a voltage of a node B in the 2D display mode; R2 represents a resistance value of the second resistor 1311; R3 represents a resistance value of the third resistor 1312; R4 represents a resistance value of the fourth resistor 1313.

As such, a current $I_{2D}$ flowing through the LED string 140 can be represented by the following equation (2):

$$I_{2D} = V_{b-2D} \times \frac{R2 + R3 + R4}{(R3 + R4) \times R1} \quad (2)$$

wherein R1 represents a resistance value of the first resistor 141.

When the LCD apparatus is in the 3D display mode, the gate of the first MOS transistor 1321 and the gate of the second MOS transistor 1322 receive the 3D display signal (namely, the high level signal), the first MOS transistor 1321 and the second MOS transistor 1322 are turned-on, and the third MOS transistor 1323 is turned-off, thus the voltage between the plurality LEDs in the LED string 140 and the first resistor 141, that is, a voltage $V_{c\text{-}3D}$ of the node C, can be represented by the following equation (3):

$$V_{c-3D} = V_{b-3D} \times \frac{R2 + R3}{R3} \quad (3)$$

wherein $V_{b\text{-}3D}$ represents the 3D display mode voltage provided by the controller 120, that is, the voltage of note B in 3D display mode; R2 represents the resistance value of the second resistor 1311; R3 represents the resistance value of the third resistor 1312.

As such, a current $I_{3D}$ flowing through the LED string 140 can be represented by the following equation (4):

$$I_{3D} = V_{b-3D} \times \frac{R2 + R3}{R3 \times R1} \quad (4)$$

wherein R1 represents the resistance value of the first resistor 141.

Therefore, the ratio of the current $I_{3D}$ flowing through the LED string 140 in the 3D display mode and the current $I_{2D}$ flowing through the LED string 140 in the 2D display mode can be represent by the following equation (5):

$$\frac{I_{3D}}{I_{2D}} = \frac{V_{b-3D}}{V_{b-2D}} \times \frac{(R2 + R3) \times (R3 + R4)}{(R2 + R3 + R4) \times R3} \quad (5)$$

In the equation (5), although $$\frac{V_{b-3D}}{V_{b-2D}}$$

is controlled by the controller 120, the ratio of the current $I_{3D}$ flowing through the LED string 140 in the 3D display mode and the current I20 flowing through the LED string 140 in the 2D display mode can be arbitrarily adjusted by adjusting the resistance value R2 of the second resistor 1311, the resistance value R3 of the third resistor 1312 and the resistance value R4 of the fourth resistor 1313, thereby enlarging the application of the driving circuit of the LED backlight in different types of LCD apparatus.

Although the present invention is described with reference to the certain exemplary embodiments, while those skilled in the art will understand: various changes in form and details may be made therein without departing from the spirit and scope of the invention as defined by the appended claims and its equivalents.

What is claimed is:

1. A LED backlight for a liquid crystal display (LCD) apparatus, comprising:
a boost circuit for boosting, in different display modes, an input voltage to a working voltage required for operating each LED string in a current display mode, wherein the display modes include a 2D display mode and a 3D display mode;
a plurality of LED strings which are connected in parallel, wherein each LED string comprises a predetermined number of LEDs which are connected in series and receives the working voltage required for operating from the boost circuit, wherein in each LED string, the predetermined number of LEDs are connected to a first resistor in series;
a current regulation circuit for regulating, in the different display modes, a current flowing through each LED string, such that a ratio of the current flowing through each LED string in the 3D display mode and the current flowing through each LED string in the 2D display mode is varied;
a controller for providing a driving signal to drive the boost circuit, and providing different display mode voltages to the current regulation circuit in the different display modes;
wherein the current regulation circuit comprises:
a plurality of voltage regulation circuits, wherein each voltage regulation circuit changes a voltage between the predetermined number of LEDs in a corresponding LED string and the first resistor in the different display modes, thereby regulating the current flowing through the LED string;
a resistance regulation circuit for changing, in the different display modes, an output resistance of each voltage regulation circuit, such that each voltage regulation circuit changes the voltage between the predetermined number of LEDs in the corresponding LED string and the first resistor.

2. The LED backlight in claim 1, wherein the voltage regulation circuit comprises a second resistor, a third resistor and a fourth resistor,
wherein a first end of the second resistor is coupled to a node between the predetermined number of LEDs and the first resistor, a second end of the second resistor is coupled to a first end of the third resistor and receives the different display mode voltage, a second end of the third resistor is coupled to a first end of the fourth resistor and is coupled to the resistance regulation circuit, and a second end of the fourth resistor is coupled to the resistance regulation circuit.

3. The LED backlight in claim 2, wherein the resistance regulation circuit comprises a first MOS transistor, a second MOS transistor, a third MOS transistor, a fifth resistor and a sixth resistor,
wherein a gate of the first MOS transistor receives 2D/3D display signals, a drain of the first MOS transistor is coupled to the second end of the third resistor of each voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to the second end of the fourth resistor of each voltage regulation circuit, and a source of the third MOS transistor is electrically grounded.

4. The LED backlight in claim 1, wherein the resistance regulation circuit comprises a first MOS transistor, a second MOS transistor, a third MOS transistor, a fifth resistor and a sixth resistor,
wherein a gate of the first MOS transistor receives 2D/3D display signals, a drain of the first MOS transistor is coupled to each voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to each voltage regulation circuit, and a source of the third MOS transistor is electrically grounded.

5. A LED backlight for a liquid crystal display (LCD) apparatus, comprising:
a boost circuit for boosting, in different display modes, an input voltage to a working voltage required for operating each LED string in a current display mode, wherein the display modes include a 2D display mode and a 3D display mode;
a plurality of LED strings which are connected in parallel, wherein each LED string comprises a predetermined number of LEDs which are connected in series and receives the working voltage required for operating from the boost circuit;
a current regulation circuit for regulating, in the different display modes, a current flowing through each LED string, such that a ratio of the current flowing through each LED string in the 3D display mode and the current flowing through each LED string in the 2D display mode is varied;
a controller for providing a driving signal to drive the boost circuit, and providing different display mode voltages to the current regulation circuit in the different display modes;
wherein the current regulation circuit comprises:
a plurality of voltage regulation circuits, wherein each voltage regulation circuit changes a voltage of a negative terminal of the predetermined number of LEDs in a corresponding LED strings in the different display modes, thereby regulating the current flowing through the LED string;
a resistance regulation circuit for changing, in the different display modes, an output resistance of each voltage regulation circuit, such that each voltage regulation circuit changes the voltage of the negative terminal of the predetermined number of LEDs in the corresponding LED strings.

6. The LED backlight in claim 5, wherein the voltage regulation circuit comprises a second resistor, a third resistor and a fourth resistor,
wherein a first end of the second resistor is coupled to the negative terminal of the predetermined number of LEDs, a second end of the second resistor is coupled to a first end of the third resistor and receives the different display mode voltage, a second end of the third resistor is coupled to a first end of the fourth resistor and is coupled to the resistance regulation circuit, and a second end of the fourth resistor is coupled to the resistance regulation circuit.

7. The LED backlight in claim 6, wherein the resistance regulation circuit comprises a first MOS transistor, a second MOS transistor, a third MOS transistor, a fifth resistor and a sixth resistor,
wherein a gate of the first MOS transistor receives 2D/3D display signals, a drain of the first MOS transistor is coupled to the second end of the third resistor of each voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to the second end of the fourth resistor of each voltage regulation circuit, and a source of the third MOS transistor is electrically grounded.

8. The LED backlight in claim 5, wherein the resistance regulation circuit comprises a first MOS transistor, a second MOS transistor, a third MOS transistor, a fifth resistor and a sixth resistor,
wherein a gate of the first MOS transistor receives 2D/3D display signals, a drain of the first MOS transistor is coupled to each voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to each voltage regulation circuit, and a source of the third MOS transistor is electrically grounded.

9. A LED backlight for a liquid crystal display (LCD) apparatus, comprising:
a boost circuit for boosting, in different display modes, an input voltage to a working voltage required for operating each LED string in a current display mode, wherein the display modes include a 2D display mode and a 3D display mode;
a LED string comprising a predetermined number of LEDs which are connected in series and receiving the working voltage required for operating from the boost circuit, wherein in the LED string, the predetermined number of LEDs are connected to a first resistor in series;
a current regulation circuit for regulating, in the different display modes, a current flowing through the LED string, such that a ratio of the current flowing through the LED string in the 3D display mode and the current flowing through the LED string in the 2D display mode is varied;
a controller for providing a driving signal to drive the boost circuit, and providing different display mode voltages to the current regulation circuit in the different display modes;
wherein the current regulation circuit comprises:
a voltage regulation circuit for changing a voltage between the predetermined number of LEDs in the LED string and the first resistor in the different display modes, thereby regulating the current flowing through the LED string;
a resistance regulation circuit for changing, in the different display modes, an output resistance of the voltage regulation circuit, such that the voltage regulation circuit changes the voltage between the predetermined number of LEDs in the LED string and the first resistor.

10. The LED backlight in claim 9, wherein the voltage regulation circuit comprises a second resistor, a third resistor and a fourth resistor,
wherein a first end of the second resistor is coupled to a node between the predetermined number of LEDs and the first resistor, a second end of the second resistor is coupled to a first end of the third resistor and receives the different display mode voltage, a second end of the third resistor is coupled to a first end of the fourth resistor and is coupled to the resistance regulation circuit, and a second end of the fourth resistor is coupled to the resistance regulation circuit.

11. The LED backlight in claim 10, wherein the resistance regulation circuit comprises a first MOS transistor, a second MOS transistor, a third MOS transistor, a fifth resistor and a sixth resistor,
wherein a gate of the first MOS transistor receives 2D/3D display signals, a drain of the first MOS transistor is coupled to the second end of the third resistor of the voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to the second end of the fourth resistor of the voltage regulation circuit, and a source of the third MOS transistor is electrically grounded.

12. The LED backlight in claim 9, wherein the resistance regulation circuit comprises a first MOS transistor, a second MOS transistor, a third MOS transistor, a fifth resistor and a sixth resistor,
wherein a gate of the first MOS transistor receives 2D/3D display signals, a drain of the first MOS transistor is coupled to the voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to the voltage regulation circuit, and a source of the third MOS transistor is electrically grounded.

13. The LED backlight of claim 9, wherein the current regulation circuit comprises:
a voltage regulation circuit for changing a voltage of a negative terminal of the predetermined number of LEDs in the LED string in the different display modes, thereby regulating the current flowing through the LED string; and
a resistance regulation circuit for changing, in the different display modes, an output resistance of the voltage regulation circuit, such that the voltage regulation circuit changes the voltage of the negative terminal of the predetermined number of LEDs in the LED string.

14. The LED backlight in claim 13, wherein the voltage regulation circuit comprises a second resistor, a third resistor and a fourth resistor,
wherein a first end of the second resistor is coupled to the negative terminal of the predetermined number of LEDs, a second end of the second resistor is coupled to a first end of the third resistor and receives the different display mode voltage, a second end of the third resistor is coupled to a first end of the fourth resistor and is coupled to the resistance regulation circuit, and a second end of the fourth resistor is coupled to the resistance regulation circuit.

15. The LED backlight in claim 14, wherein the resistance regulation circuit comprises a first MOS transistor, a second MOS transistor, a third MOS transistor, a fifth resistor and a sixth resistor,
wherein a gate of the first MOS transistor receives 2D/3D display signals, a drain of the first MOS transistor is coupled to the second end of the third resistor of the voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to the second end of the fourth resistor of the voltage regulation circuit, and a source of the third MOS transistor is electrically grounded.

16. The LED backlight in claim 13, wherein the resistance regulation circuit comprises a first MOS transistor, a second MOS transistor, a third MOS transistor, a fifth resistor and a sixth resistor,
wherein a gate of the first MOS transistor receives 2D/3D display signals, a drain of the first MOS transistor is coupled to the voltage regulation circuit, a source of the first MOS transistor is electrically grounded, a gate of the second MOS transistor receives the 2D/3D display signals, a drain of the second MOS transistor is coupled to a first end of the fifth resistor, a source of the second MOS transistor is electrically grounded, a second end of the fifth resistor receives a pull-up voltage, a first end of the sixth resistor is coupled to the drain of the second MOS transistor, a second end of the sixth resistor is electrically grounded, a gate of the third MOS transistor is coupled to the drain of the second MOS transistor, a drain of the third MOS transistor is coupled to the voltage regulation circuit, and a source of the third MOS transistor is electrically grounded.

* * * * *